United States Patent
Grabarnik et al.

(10) Patent No.: US 11,630,260 B2
(45) Date of Patent: Apr. 18, 2023

(54) PRODUCTION METHOD AND CORRESPONDING STRUCTURES OF COMPOUND LIGHT-GUIDE OPTICAL ELEMENTS

(71) Applicant: Lumus Ltd., Ness Ziona (IL)

(72) Inventors: Shimon Grabarnik, Rehovot (IL); Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/794,965

(22) PCT Filed: May 24, 2021

(86) PCT No.: PCT/IL2021/050610
§ 371 (c)(1),
(2) Date: Jul. 24, 2022

(87) PCT Pub. No.: WO2021/240515
PCT Pub. Date: Dec. 2, 2021

(65) Prior Publication Data
US 2022/0390665 A1  Dec. 8, 2022

Related U.S. Application Data

(60) Provisional application No. 63/029,500, filed on May 24, 2020.

(51) Int. Cl.
B29D 11/00 (2006.01)
F21V 8/00 (2006.01)

(52) U.S. Cl.
CPC ...... *G02B 6/0065* (2013.01); *B29D 11/00721* (2013.01); *G02B 6/0035* (2013.01)

(58) Field of Classification Search
CPC .............................................. B29D 11/00721
See application file for complete search history.

(56) References Cited

U.S. PATENT DOCUMENTS 1,072,529 A    9/1913   Thiel
2,748,659 A    6/1956   Geffcken et al.
(Continued)

FOREIGN PATENT DOCUMENTS

CN    101542346    9/2009
CN    107238928    10/2017
(Continued)

OTHER PUBLICATIONS

Da-Yong et al., "A Continuous Membrance Micro Deformable Mirror Based on Anodic Bonding of Soi to Glass Water", Microsystem Technologies, Micro and Nanosystems Information Storage and Processing Systems, vol. 16, No. 10, May 20, 2010 pp. 1765-1769.

*Primary Examiner* — Rhonda S Peace
(74) *Attorney, Agent, or Firm* — Mark M. Friedman

(57) ABSTRACT

A method of fabricating a compound light-guide optical element (LOE) is provided. A bonded stack of a plurality of LOE precursors and a plurality of transparent spacer plates alternating therebetween is bonded to a first optical block having a plurality of mutually parallel obliquely angled internal surfaces. The block is joined to the stack such that first plurality of partially reflective internal surfaces of the block is non-parallel to the internal surfaces of the LOE precursor. After bonding, a second optical is thereby formed. At least one compound LOE is sliced-out of the second optical block by cutting the second block through at least two consecutive spacer plates having a LOE precursor sandwiched therebetween.

13 Claims, 17 Drawing Sheets

(56) References Cited

U.S. PATENT DOCUMENTS

| | | |
|---|---|---|
| 2,795,069 A | 6/1957 | Hardesty |
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | Simon |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,005,320 A | 4/1991 | Du Pont |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Machler |
| 5,708,449 A | 1/1998 | Heacock et al. |
| 5,724,163 A | 3/1998 | David |
| 5,745,199 A | 4/1998 | Suzuki et al. |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,023,372 A | 2/2000 | Spitzer et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,519,400 B2 | 2/2003 | Biscardi et al. |
| 6,542,307 B2 | 4/2003 | Gleckman et al. |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,762,801 B2 | 7/2004 | Weiss et al. |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Ida et al. |
| 6,829,095 B2 | 12/2004 | Amitai |
| 6,847,488 B2 | 1/2005 | Travis |
| 6,880,931 B2 | 4/2005 | Moliton et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,643,214 B2 | 1/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,839,575 B2 | 11/2010 | DeJong et al. |
| 7,949,214 B2 | 5/2011 | Dejong |
| 7,995,275 B2 | 8/2011 | Maeda et al. |
| 8,035,872 B2 | 10/2011 | Ouchi |
| 8,548,290 B2 | 10/2013 | Travers |
| 8,655,178 B2 | 2/2014 | Capron et al. |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,870,384 B2 | 10/2014 | Imai et al. |
| 8,913,865 B1 | 12/2014 | Bennett |
| 9,025,253 B2 | 5/2015 | Hadad et al. |
| 9,568,738 B2 | 2/2017 | Mansharof et al. |
| 9,791,703 B1 | 10/2017 | Vallius |
| 9,805,633 B2 | 10/2017 | Zheng |
| 9,933,684 B2 | 4/2018 | Brown et al. |
| 10,133,070 B2 | 11/2018 | DAnziger |
| 10,437,068 B2 | 10/2019 | Weng |
| 10,678,055 B2 | 6/2020 | Edwin et al. |
| 10,739,512 B2 | 8/2020 | Eisenfeld et al. |
| 10,962,787 B1 | 3/2021 | Lou |
| 10,983,264 B2 | 4/2021 | Danziger et al. |
| 11,125,927 B2 | 9/2021 | Danziger et al. |
| 11,243,434 B2 | 2/2022 | Sharlin et al. |
| 2001/0000124 A1 | 4/2001 | Kollin |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0169504 A1 | 9/2003 | Kaminsky |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0008356 A1 | 1/2005 | Ohkado |
| 2005/0018308 A1 | 1/2005 | Cassarly et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0268421 A1 | 11/2006 | Shimizu et al. |
| 2007/0070859 A1 | 3/2007 | Hirayama |
| 2007/0091445 A1 | 4/2007 | Amitai |
| 2008/0019847 A1 | 1/2008 | Burns et al. |
| 2008/0094586 A1 | 4/2008 | Hirayama |
| 2008/0151379 A1 | 6/2008 | Amitai |
| 2009/0003406 A1 | 1/2009 | Sjogren et al. |
| 2009/0034069 A1 | 2/2009 | Hsu |
| 2009/0122414 A1 | 5/2009 | Amitai |
| 2009/0190222 A1 | 7/2009 | Simmonds et al. |

(56) References Cited

U.S. PATENT DOCUMENTS

| | | |
|---|---|---|
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2012/0039576 A1 | 2/2012 | Dangel et al. |
| 2012/0147361 A1 | 6/2012 | Mochizuki et al. |
| 2012/0206817 A1 | 8/2012 | Totani et al. |
| 2012/0306940 A1 | 12/2012 | Machida |
| 2013/0007833 A1 | 1/2013 | Kitazato et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0160529 A1 | 6/2015 | Popovich et al. |
| 2015/0219834 A1 | 8/2015 | Nichol et al. |
| 2015/0338655 A1 | 11/2015 | Sawada et al. |
| 2016/0234485 A1 | 8/2016 | Robbins et al. |
| 2017/0045743 A1 | 2/2017 | Dobschal et al. |
| 2017/0075119 A1 | 3/2017 | Schultz et al. |
| 2017/0242249 A1 | 8/2017 | Wall |
| 2017/0285346 A1 | 10/2017 | Pan |
| 2017/0293140 A1 | 10/2017 | Cai et al. |
| 2017/0343822 A1 | 11/2017 | Border et al. |
| 2017/0371160 A1 | 12/2017 | Schultz |
| 2018/0021020 A1 | 1/2018 | Lefevre et al. |
| 2018/0021202 A1 | 1/2018 | Weber et al. |
| 2018/0246335 A1 | 8/2018 | Cheng et al. |
| 2018/0284448 A1 | 10/2018 | Matsuki et al. |
| 2018/0292599 A1 | 10/2018 | Ofir et al. |
| 2019/0064518 A1 | 2/2019 | Danziger |
| 2019/0212487 A1 | 7/2019 | Danziger |
| 2019/0227215 A1 | 7/2019 | Danziger et al. |
| 2019/0293838 A1 | 9/2019 | Haba et al. |
| 2020/0020966 A1 | 1/2020 | Imai et al. |
| 2020/0192101 A1 | 6/2020 | Ayres |
| 2020/0200963 A1* | 6/2020 | Eisenfeld ............ G02B 6/0018 |
| 2020/0209667 A1 | 7/2020 | Sharlin et al. |
| 2020/0278554 A1 | 9/2020 | Schultz et al. |
| 2020/0292819 A1 | 9/2020 | Danziger |
| 2020/0310024 A1* | 10/2020 | Danziger ............ G02B 6/0055 |
| 2021/0018755 A1 | 1/2021 | Amitai |
| 2021/0033773 A1 | 2/2021 | Danziger et al. |
| 2021/0033774 A1 | 2/2021 | Tanaka |
| 2022/0030205 A1 | 1/2022 | Danziger |
| 2022/0137274 A1* | 5/2022 | Sharlin ............ B29D 11/00663 359/584 |
| 2022/0155629 A1 | 5/2022 | Sharlin et al. |
| 2022/0357497 A1 | 11/2022 | Ronen et al. |
| 2022/0357498 A1* | 11/2022 | Fuchs ................. G02B 6/0028 |
| 2022/0390665 A1* | 12/2022 | Grabarnik ........... G02B 6/0035 |

FOREIGN PATENT DOCUMENTS

| | | |
|---|---|---|
| DE | 1422172 | 11/1970 |
| DE | 19725262 | 12/1998 |
| DE | 102013106392 | 12/2014 |
| DE | 202019101599 | 5/2019 |
| EP | 0380035 | 8/1990 |
| EP | 0399865 | 11/1990 |
| EP | 0543718 | 5/1993 |
| EP | 0566004 | 10/1993 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | 2002539498 | 11/2002 |
| JP | 2003140081 | 5/2003 |
| JP | 2004527801 | 9/2004 |
| JP | 2005084522 | 3/2005 |
| JP | 2006201637 | 8/2006 |
| JP | 4394919 | 1/2010 |
| JP | 2011-028141 | 2/2011 |
| JP | 2015121647 | 7/2015 |
| WO | 0004407 | 1/2000 |
| WO | 0063738 | 10/2000 |
| WO | 0195025 | 12/2001 |
| WO | 2005093493 | 10/2005 |
| WO | 2006098097 | 9/2006 |
| WO | 2007054928 | 5/2007 |
| WO | 2009074638 | 6/2009 |
| WO | 2011130720 | 10/2011 |
| WO | 2013065656 | 5/2013 |
| WO | 2015081313 | 6/2015 |
| WO | 2016103263 | 6/2016 |
| WO | 2017106873 | 6/2017 |
| WO | 2020049542 | 3/2020 |
| WO | 2021053661 | 3/2021 |
| WO | 2021/124315 | 6/2021 |
| WO | 2021/152602 | 8/2021 |
| WO | 2021/191889 | 9/2021 |

* cited by examiner

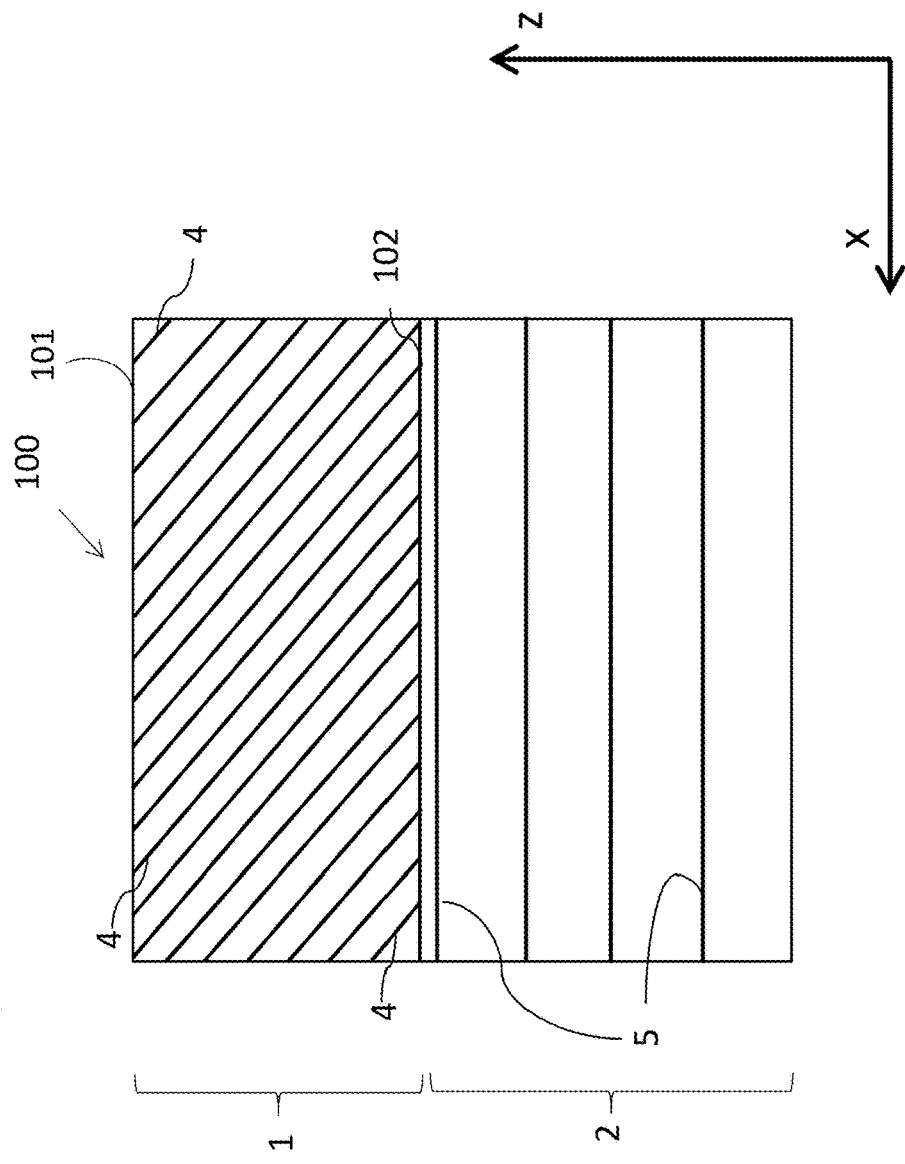
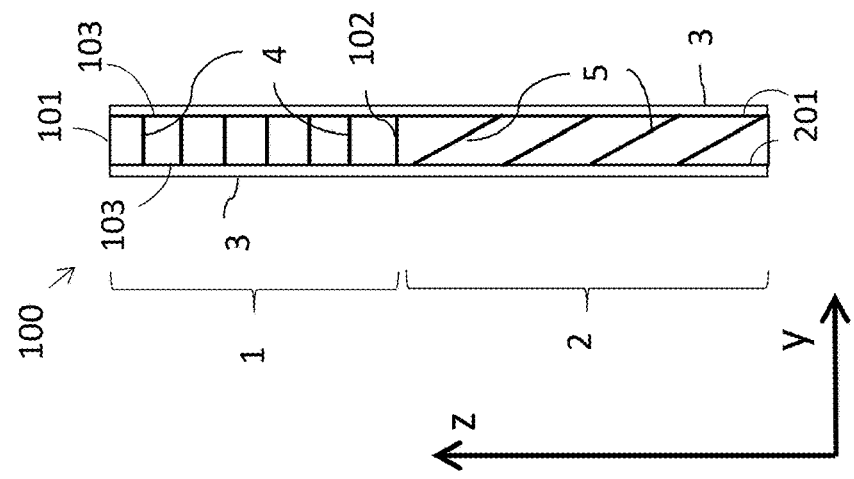
PRIOR ART
Figure 1(b)
Figure 1(a)

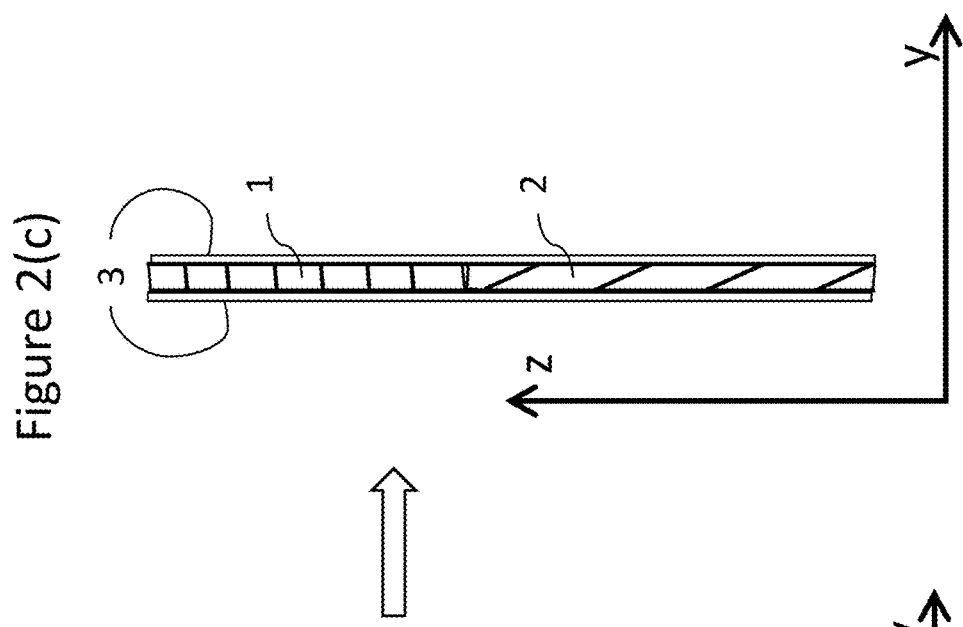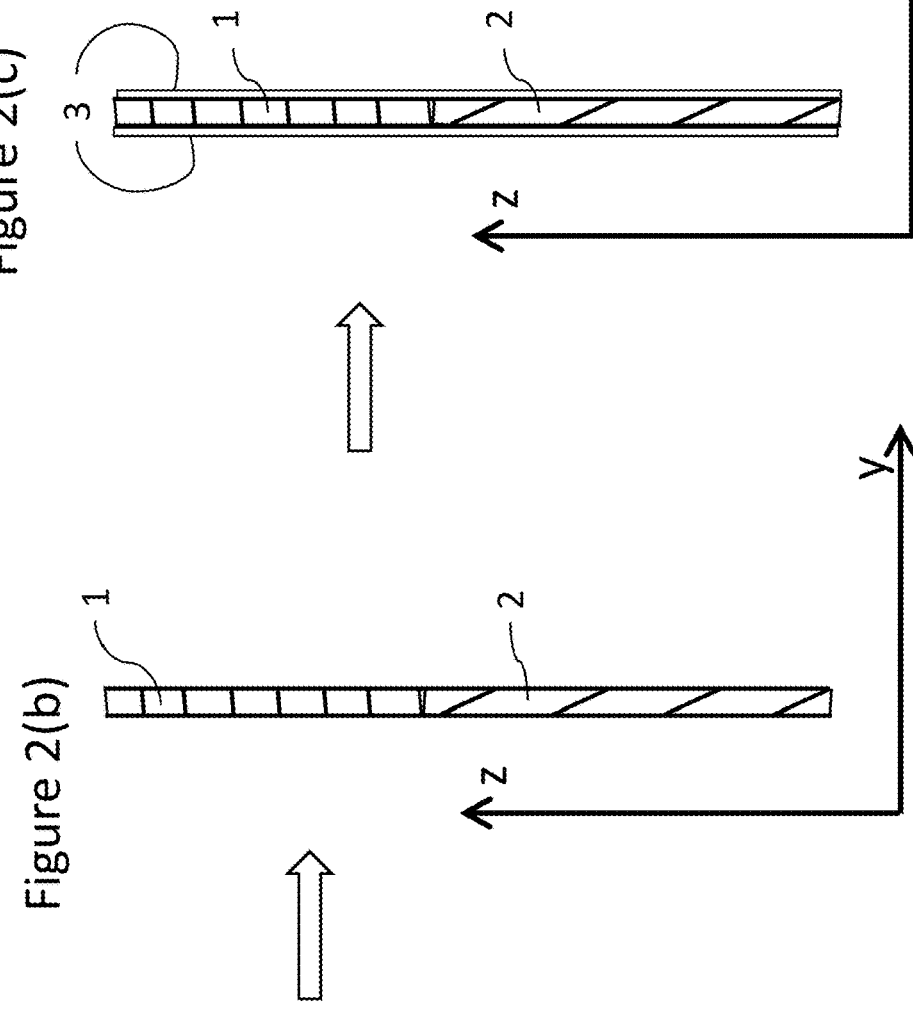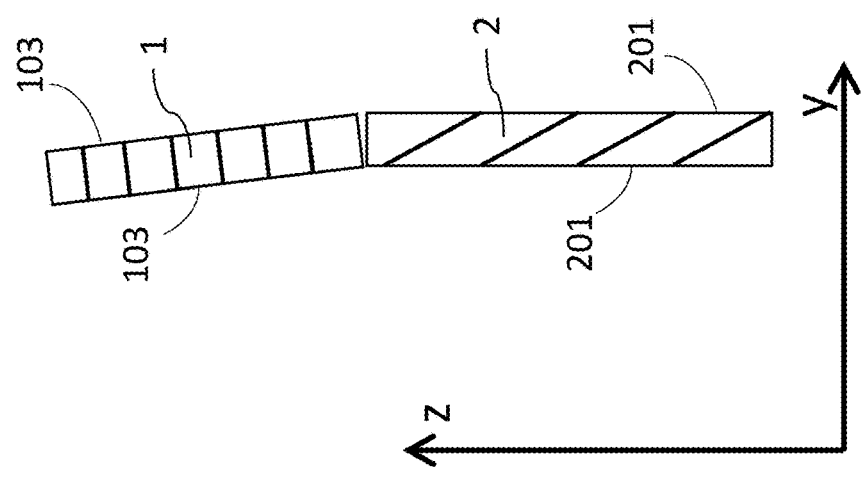

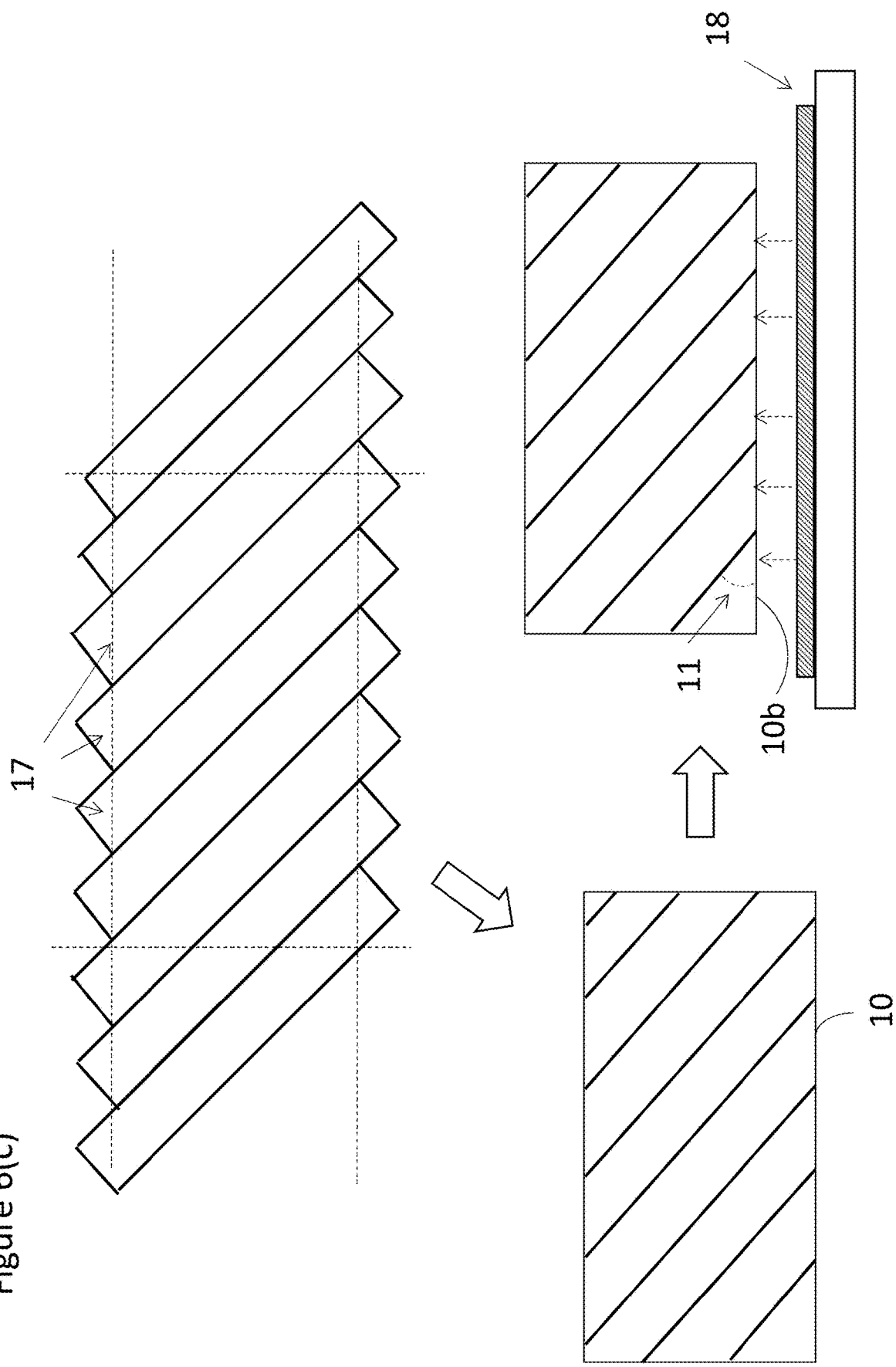

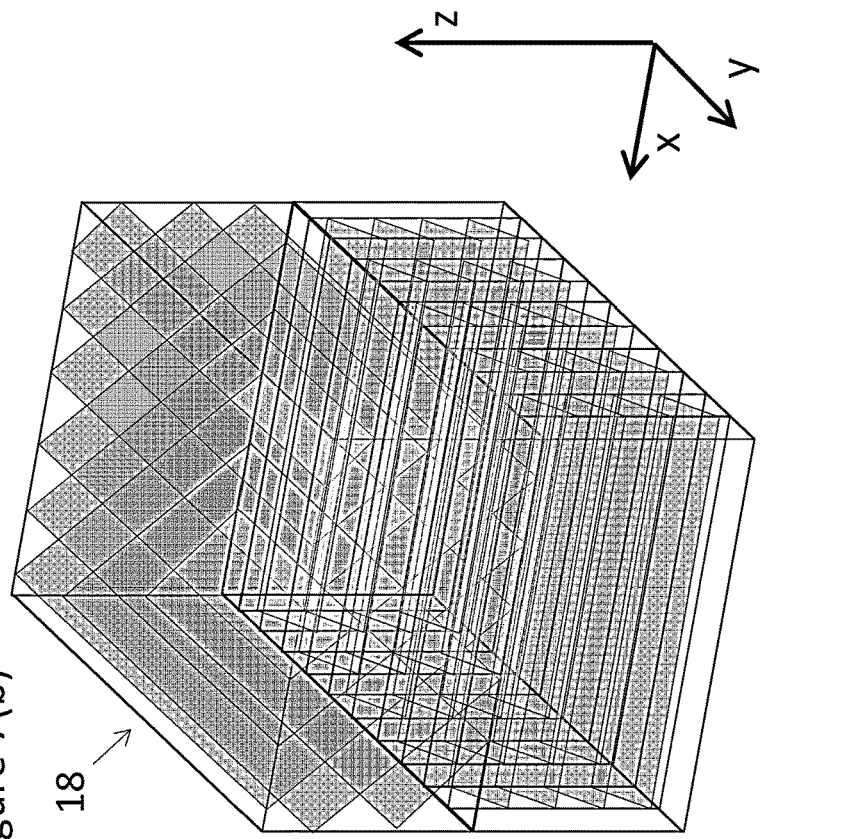
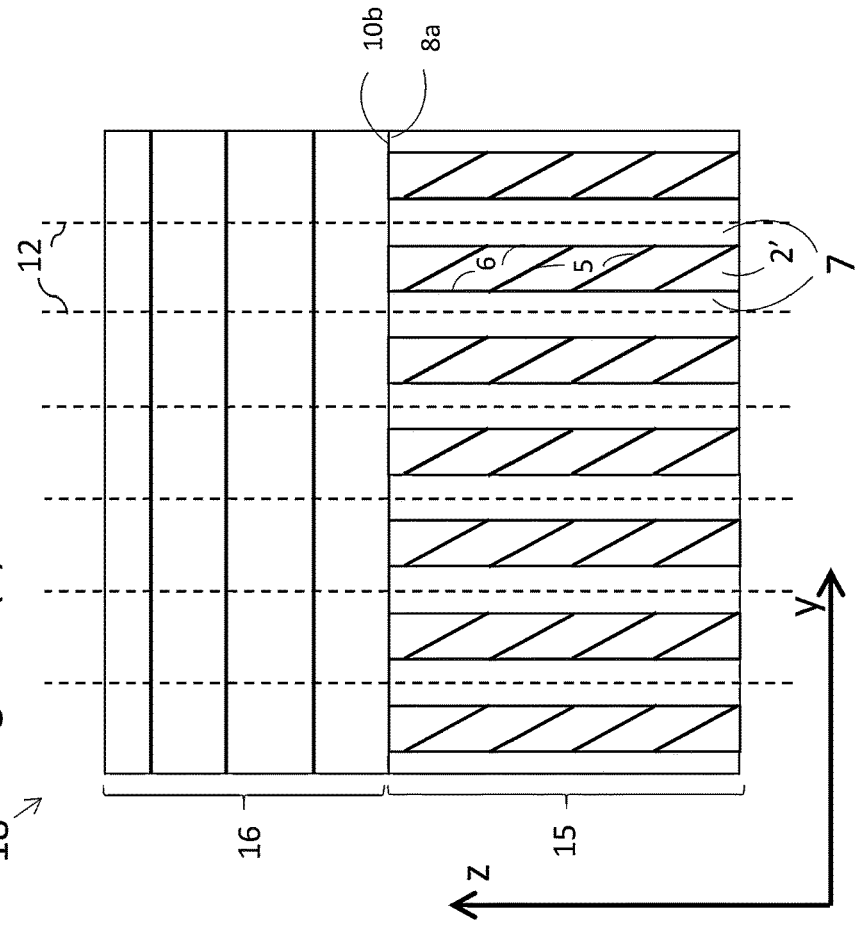
Figure 7(a)
Figure 7(b)

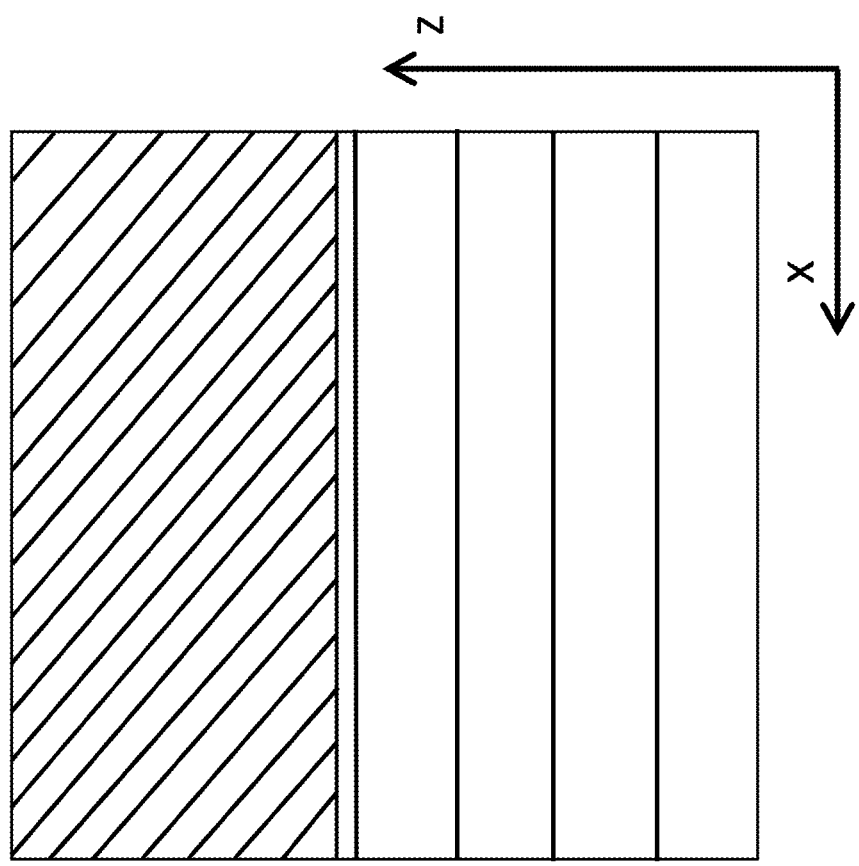
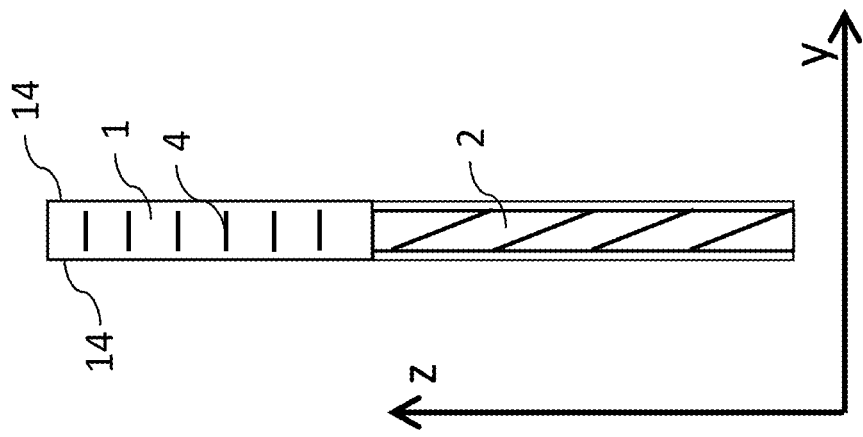

PRODUCTION METHOD AND CORRESPONDING STRUCTURES OF COMPOUND LIGHT-GUIDE OPTICAL ELEMENTS

FIELD AND BACKGROUND OF THE INVENTION

The present invention relates to light-guide optical elements (LOE), and, in particular, to compound LOEs for two-dimensional image expansion and their methods of manufacture.

Compound LOEs or "two-dimensional expansion waveguides" have been described in previous publications by Lumus Ltd. (Israel). Examples of such compound LOEs may be found, for example, in PCT publication WO 2020/049542. In general terms, these compound LOEs employ two regions, each of which is a parallel-faced block of transparent material for supporting propagation of light carrying a collimated image by internal reflection at major surfaces, and includes a set of mutually-parallel, internal, partially-reflecting surfaces or "facets", which redirect the collimated image while achieving expansion of the optical aperture. By combining two such elements with different facet orientations, it is possible to achieve two-dimensional expansion of an optical aperture within a single element, thereby expanding an input image from an image projector and outputting it over a larger area towards the eye of an observer.

SUMMARY OF THE INVENTION

According to one aspect of the present invention there is provided a method of fabricating a compound light-guide optical element (LOE), including: providing a bonded stack of a plurality of LOE precursors and a plurality of transparent spacer plates, the stack having a first pair of parallel faces, the stack including alternating LOE precursor and transparent spacer plates along a length of the stack perpendicular to the pair of parallel faces, each LOE precursor comprising a pair of major parallel surfaces and a first plurality of mutually parallel partially reflective internal surfaces angled obliquely relative to the pair of parallel surfaces; providing a first optical block having a second pair of parallel faces, and a plurality of mutually parallel internal surfaces angled obliquely relative to the second pair of parallel faces, the internal surfaces being at least partly partially reflective such that the first block includes a second plurality of mutually parallel partially reflective internal surfaces; bonding the first block to the stack such that one of the faces of the first block is joined to one of the faces of the stack and the first plurality of partially reflective internal surfaces is non-parallel to the second plurality of partially reflective internal surfaces, thereby forming a second optical block; and slicing out at least one compound LOE from the second block by cutting the second block through at least two consecutive spacer plates having a LOE precursor sandwiched therebetween.

According to some aspects, the internal surfaces of the first block are each only partly coated with a partially reflective coating, such that internal surface comprises strips of partially reflective coating with gaps therebetween.

According to some aspects, the method includes polishing the face of the stack that will be joined to the first block prior to bonding the stack with the first block and/or polishing the face of the first block that will be joined to the stack prior to bonding the first block with the stack.

According to some aspects, the method includes, prior to bonding the first block to the stack: aligning the first block and the stack such that first plurality of partially reflective internal surfaces and the second plurality of partially reflective internal surfaces are orthogonal.

According to some aspects, the method includes polishing the external surfaces of the sliced-out at least one compound LOE that are parallel to the major parallel surfaces of the LOE precursor.

According to some aspects, the internal surfaces of the first block are each only partly coated with a partially reflective coating, such that internal surface comprises strips of partially reflective coating with gaps therebetween.

According to another aspect of the present invention there is provided an optical structure that is an intermediate work product of a compound LOE fabrication process, the optical structure including: a first region including a plurality of LOE precursors separated by transparent spacer plates therebetween, each LOE precursor including a pair of major external parallel surfaces and a first plurality of mutually parallel partially reflective internal surfaces being angled obliquely relative to the pair of parallel surfaces; a second region including a second plurality of mutually parallel partially reflective internal surfaces being non-parallel to the first plurality of partially reflective surfaces; and at least one internal surface separating the first and second region, the internal surface being perpendicular to the pairs of parallel surfaces.

According to some aspects, the optical structure is formed by bonding a first optical block including the first region with a second optical block including the second region.

According to some aspects, the optical structure can include a third optical region between the first region and the second region. The third optical region can include one or more optical elements. The optical elements can be optically active elements or optically inert elements. In some aspects, at least one sub-region within the second region can be free of any partially reflective internal surfaces and/or each LOE precursor in the first region can include at least one sub-region that is free of any partially reflective internal surfaces.

BRIEF DESCRIPTION OF THE DRAWINGS

The invention is herein described, by way of example only, with reference to the accompanying drawings, wherein:

FIGS. 1(a)-1(b) illustrate an embodiment of a compound LOE according to the prior art;

FIGS. 2(a)-2(c) illustrate known methods of fabricating a compound LOE;

FIG. 6(c) illustrates a method of forming the block of FIGS. 6(a)-6(b);

FIGS. 7(a)-7(b) illustrate an optical structure formed from bonding the block of FIGS. 6(a)-6(b) to the stack of FIGS. 5(a)-5(b);

FIGS. 10(a)-10(b) illustrate a compound LOE cut from the optical structure of FIGS. 9(a)-9(b);

DESCRIPTION OF THE PREFERRED EMBODIMENTS

Figure 3B:
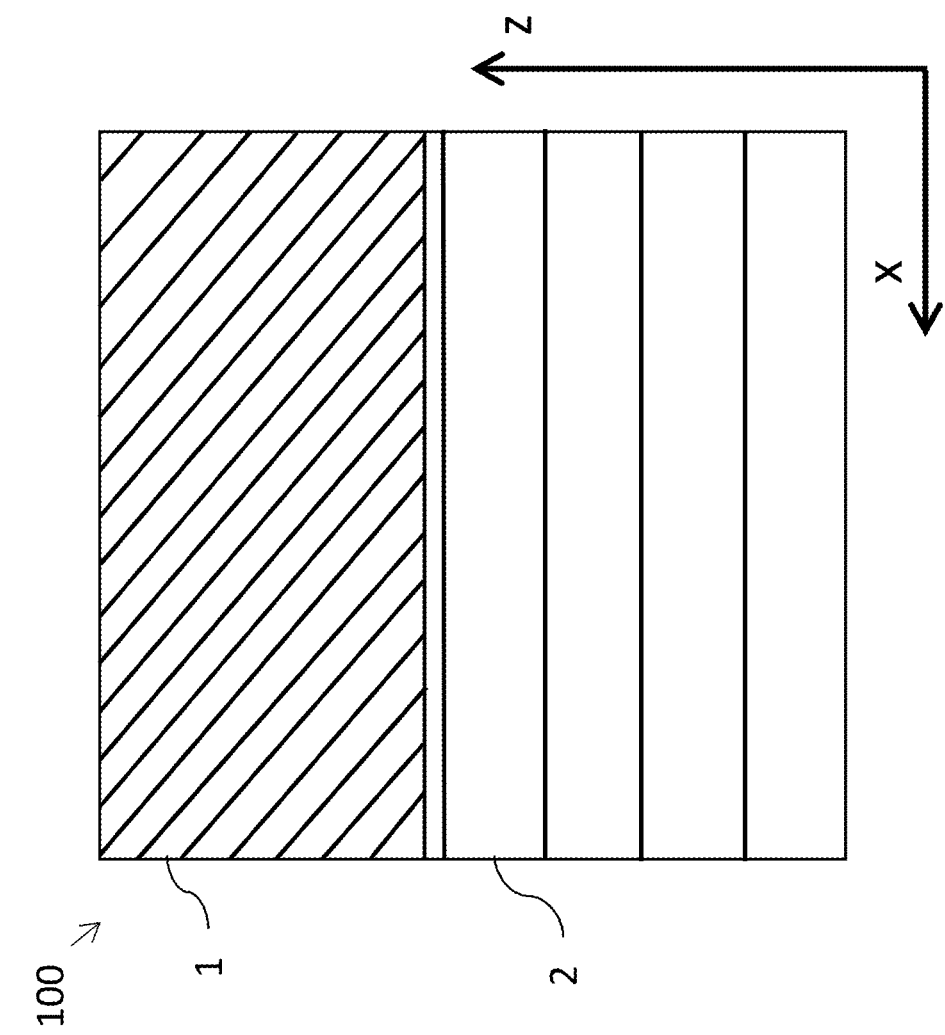
FIGS. 3(a)-3(b) illustrate another embodiment of a compound LOE.

FIGS. 1(a)-1(b) illustrate an embodiment of a compound LOE 100 according to the prior art. Compound LOE 100 includes a first LOE 1 and a second LOE 2 bonded together at interface 102. LOE 1 includes a pair of major parallel surfaces 101, 102 and a plurality of mutually parallel partially reflective internal surfaces ("facets") 4 that are obliquely angled relative to surfaces 101, 102. The reflectivity is provided via coatings on the internal surfaces prior to forming LOE 1. The reflectance of each of the facets may be the same or different from one another. Facets 4 are configured to guide an image from an external microprojector (not shown) towards LOE 2 while expanding the image in one dimension (in this case the x-dimension). LOE 1 includes surfaces 103 that are perpendicular to surfaces 101, 102.

LOE 2 also include a pair of major parallel surfaces 201 that are perpendicular to surfaces 101, 102 of LOE 1, and a plurality of mutually parallel partially reflective facets 5 that are obliquely angled relative to surfaces 201. In some embodiments, as shown in FIGS. 1(a)—1(b), the spatial orientation of facets 5 relative to facets 4 may be orthogonal, although other orientations are also possible depending on the design specifications of the specific application for the compound LOE. The reflectivity of facets 5 is provided via coatings on the internal surfaces prior to forming LOE 2. The reflectance of each of facets may be the same or different from one another. Facets 5 are configured to guide the image from LOE 1 (now expanded in one dimension) to an observer while expanding the image in the second dimension (in this case the z-dimension)

Compound LOE 100 further includes transparent cover plates 3 on the surfaces of LOE 100 in the XZ plane. The surfaces covered by plates 3 include surfaces 103 of LOE 1 and surfaces 201 of LOE 2. Accordingly, these surfaces need to be accurately aligned in order to apply plates 3.

FIGS. 2(a)-2(c) illustrate known methods of fabricating a compound LOE. Typically, LOE 1 and LOE 2 are manufactured separately and bonded together. Throughout this document, the term "bonding" should be understood to mean attaching with an optical glue or adhesive. The bonded LOEs are then polished on the external surfaces. Cover plates 3 are applied to the polished surfaces, and these cover plates are then typically polished as well. Using this fabrication method, the bonding process between LOE 1 to LOE 2 must be performed with very high precision so that surfaces 103 of LOE 1 are in the same plane as the corresponding surfaces 201 of LOE 2. This method is prone to misalignment as shown in FIGS. 2(a)-2(c).

Figure 3A:
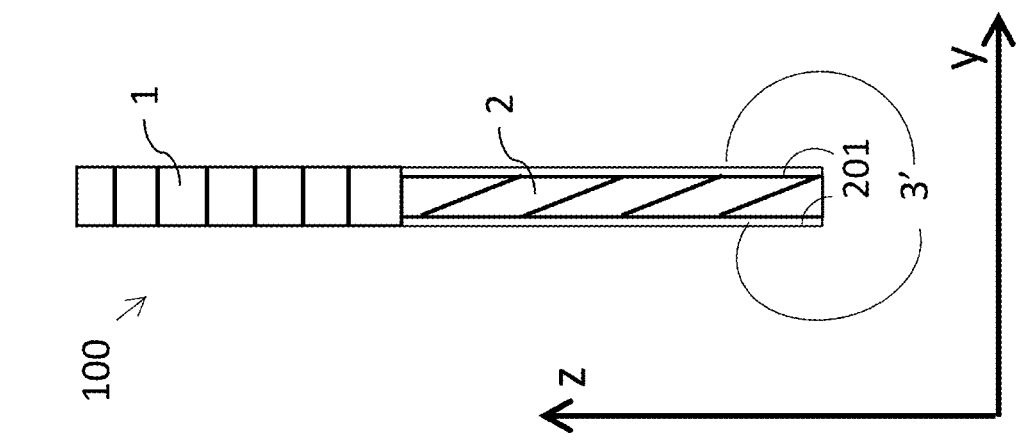

In order to overcome the difficulties described above, the present invention discloses a new method of fabricating a compound LOE. In addition to overcoming the problems of precise alignment during bonding of LOE 1 to LOE 2, the presently disclosed process allows for fabrication of a new embodiment of compound LOE 100 in which transparent cover plates 3' exist only on surfaces 201 of LOE 2, as shown in FIGS. 3(a)-3(b). This embodiment of the compound LOE is discussed in further detail in a co-pending PCT application entitled "Compound Light-Guide Optical Elements", filed on the same day as this application, taking priority from U.S. provisional patent application No. 63/029,496 that was filed 24 May 2020.

Figure 4B:
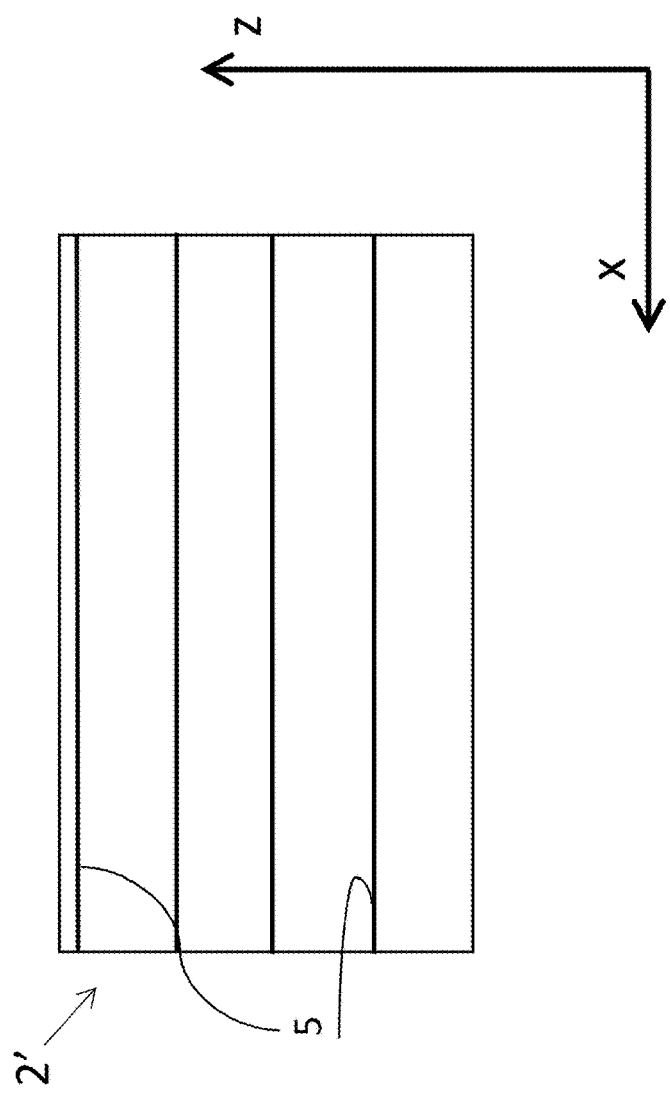
FIGS. 4(a)-4(b) illustrate an LOE having a given thickness d1.
Figure 4A:
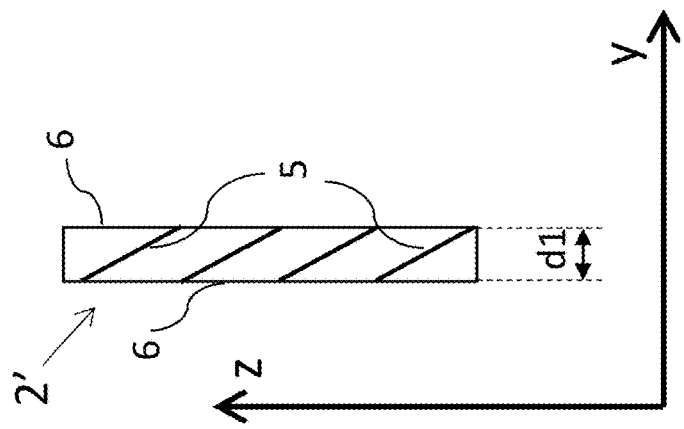

FIGS. 4(a)-4(b) illustrate a LOE "precursor" 2', which should be understood to mean an intermediate optical element in the production of LOE 2. LOE precursor 2' includes a pair of major parallel external surfaces 6 and a plurality of mutually parallel partially reflective internal surfaces ("facets") 5 angled obliquely relative to the pair of parallel surfaces. The LOE precursor has a predetermined thickness between surfaces 6 which is denoted herein as d1. Known methods exist for manufacturing a LOE precursor, for example as described in PCT Publication WO 2016/103263.

Figure 5B:
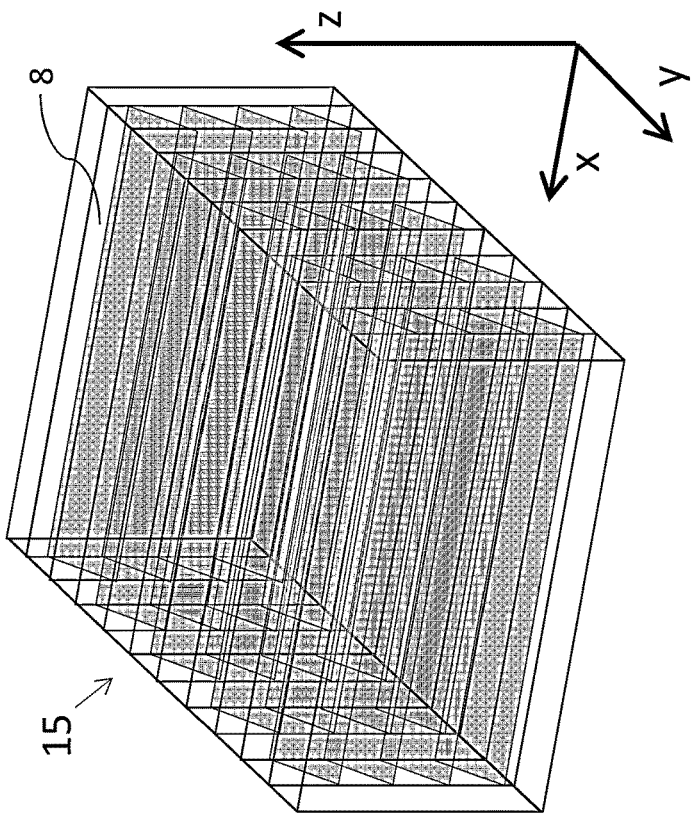
FIGS. 5(a)-5(b) illustrate a stack of bonded LOE precursors separated by transparent plates of a given thickness d2.
Figure 5A:
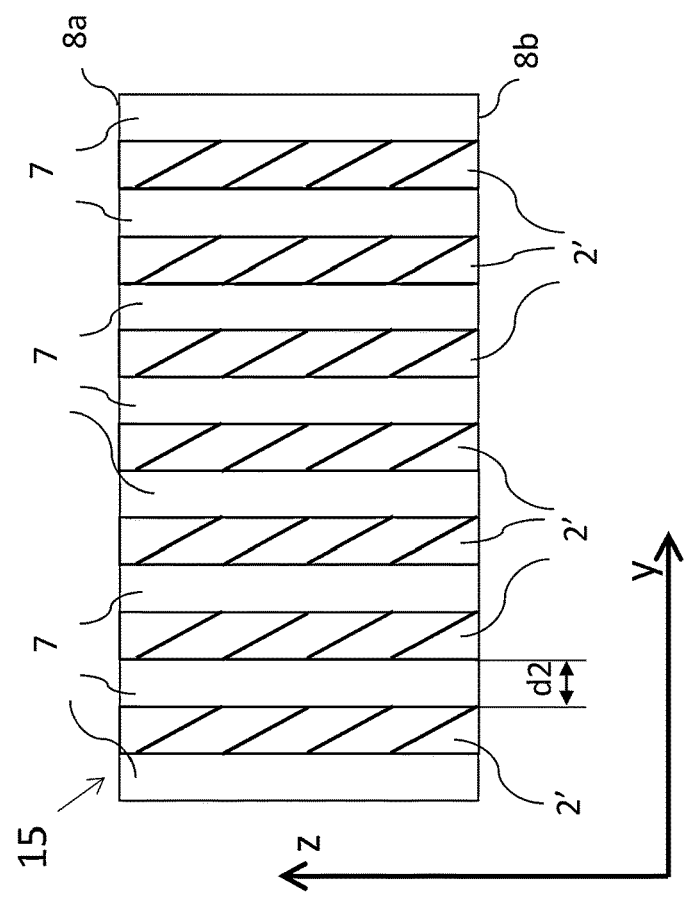

Referring now to FIGS. 5(a)-5(b), after fabricating a plurality of LOE precursors, a bonded stack 15 of the plurality of LOE precursors having the same thickness d1 and a plurality of transparent spacer plates 7 is formed. The stack is composed of alternating LOE precursor and transparent spacer plate along the length of the stack (y-dimension). Each transparent plate has the same predetermined thickness denoted herein as d2. Stack 15 has a pair of parallel faces 8a, 8b extending along the length of the stack perpendicular to surfaces 6.

Figure 6B:
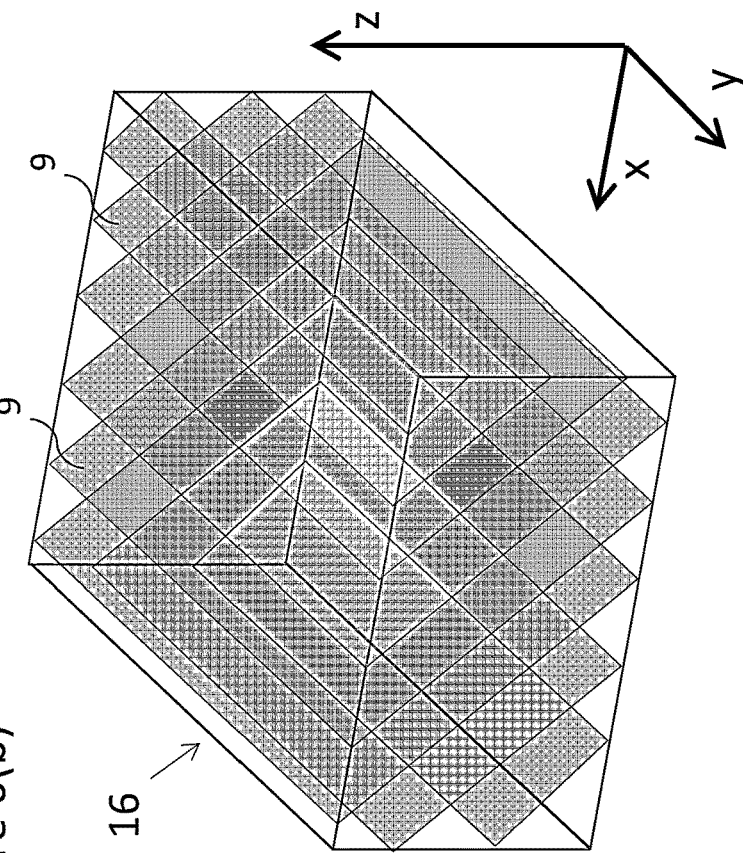
FIGS. 6(a)-6(b) illustrate a block of transparent plates.
Figure 6A:
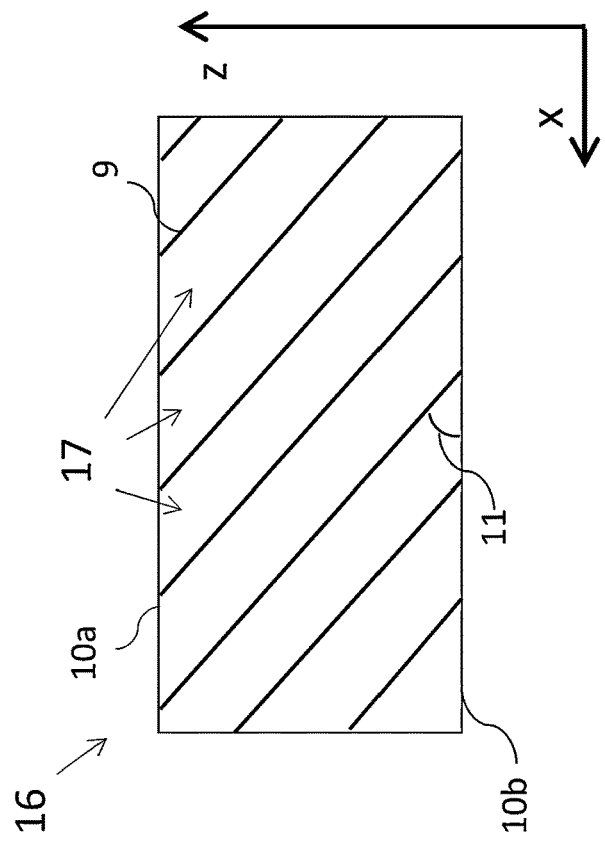

Referring now to FIGS. 6(a)-6(b), an optical block 16 with parallel faces 10a, 10b is formed from a plurality of bonded, transparent coated plates 17 (each plate coated with a partially reflective coating), thereby forming a plurality of mutually parallel partially reflective internal surfaces 9 that are each angled obliquely relative to face 10b at a predetermined angle 11 (also referred to as the "facet tilt angle").

Known methods exist for forming optical block 16. For example, as shown in FIG. 6(c), one method includes stacking and bonding a plurality of coated plates 17 and cutting the stack along the dashed lines shown in FIG. 6(c), in order to extract the block. Face 10b is then polished by a polishing apparatus 18 to achieve the desired facet tilt angle 11, which may vary according to the particular design specifications of the final compound LOE.

Referring now to FIGS. 7(a)-7(b), block 16 is aligned with and bonded to stack 15 thereby forming an optical block 18. More specifically, face 10b of block 16 is bonded to face 8a of stack 15. Either or both of face 10b and 8a may be polished flat prior to bonding. The particular alignment between block 16 and stack may vary according to the design specifications of the product. In the embodiment corresponding to the compound LOE shown in FIGS. 3(a)-3(b), the alignment of the blocks 15 and 16 can be understood as follows, with reference to the coordinate system XYZ shown in FIGS. 7(a)-7(b). Stack 15 and block 16 shall be aligned so that surfaces 6 of LOE precursors 2' are parallel to the plane XZ, face 8a of stack 15 is parallel to the plane XY, facets 5 of the LOE precursors 2' are perpendicular to the plane YZ, plates 17 of block 16 are perpendicular to the plane XZ, and face 10b of block 16 is parallel to the plane XY. After alignment, plates 17 are perpendicular to the surfaces 6 of LOE precursors 2' in stack 15.

The aligned and bonded structure is denoted herein as optical block 18, which in fact is an optical structure that is an intermediate work product of a compound LOE fabrication process. As shown, block 18 includes a first region with a plurality of LOE precursors separated by transparent spacer plates between the LOE precursors, a second region with a plurality of mutually parallel partially reflective internal surfaces, and an internal surface separating the first and second region. In other embodiments, as will be further detailed below, intermediate block 18 can also include one or more additional sub-regions in the first and/or second regions. These sub-regions can include non-faceted areas as well as areas comprising one or more optically active or optically inert elements. These sub-regions can be added to block 18 by adding one or more plates, some of which may include optically active elements, to block 16 prior to bonding with stack 15, as will be detailed below with reference to FIGS. 11(a)-13(d).

Figure 7D:
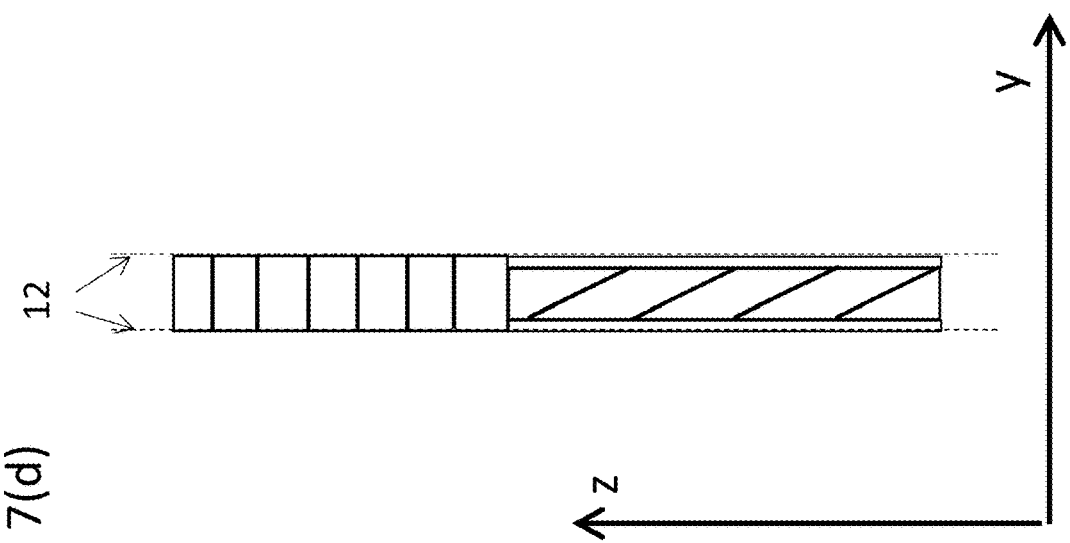
FIGS. 7(c)-7(d) illustrate a slice taken from the block of FIGS. 7(a)-7(b)
Figure 7C:
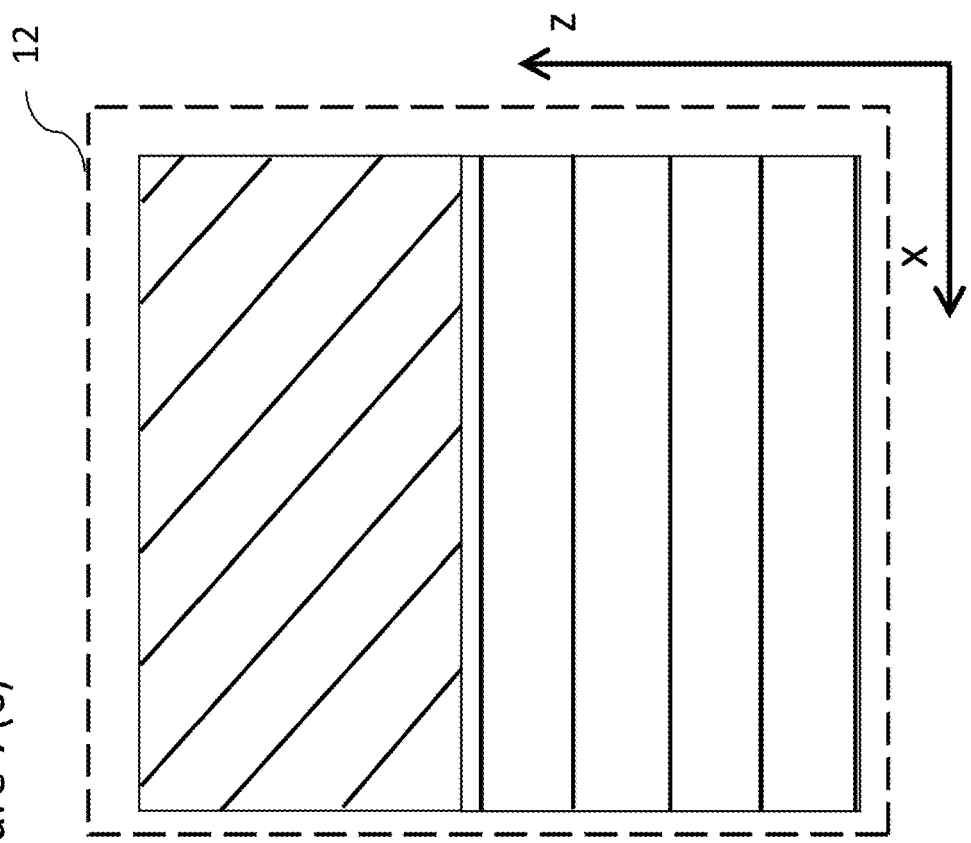

Block 18 is sliced using a cutting apparatus (not shown) at predetermined intervals along the length of stack 15 (y-dimension) and through spacer plates 7 to form a plurality of compound LOE structures sliced-out of block 18. The planes of slicing are shown in FIGS. 7(a)-7(b) as dashed lines 12, and a single slice is shown in FIGS. 7(c)-7(d). A compound LOE sliced-out of block 18 has a similar structure to the compound LOE shown in FIGS. 3(a)-3(b). It should be observed that after slicing, the spacer plates (more precisely, the half-spacer plates) provide a similar structure as cover plate 3' in FIGS. 3(a)-3(b), thereby obviating the need to attach separate cover plates 3'. Each of the sliced-out compound LOE structures are then polished on the external surfaces made up of plates 7 and 17 to form the final compound LOEs suitable for guiding light via internal reflection.

Optionally, additional transparent cover plates can be bonded to the final compound LOE over plates 17 and 17 and those cover plates polished (in which case LOE 1 will have a single cover plate and LOE 2 will have a double cover plate).

As detailed above with reference to FIGS. 5(a)-5(b), the transparent plates have a predetermined thickness d2. In some embodiments, the predetermined thickness d2 is determined according to the following equation:

$$d2=2t+2p+s$$

where t denotes the desired difference between the thickness of the first LOE cover plate and second LOE cover plate, p denotes the thickness of the material removed during polishing, and s denotes the thickness of the cut including tolerances for cut positioning in a sawing machine. It should be noted that in the case that cover plates are desired only for LOE 2 and not LOE 1, t simply denotes the thickness of the LOE 2 cover plate. The typical values of t may range from 50 microns to 500 microns.

Figure 8B:
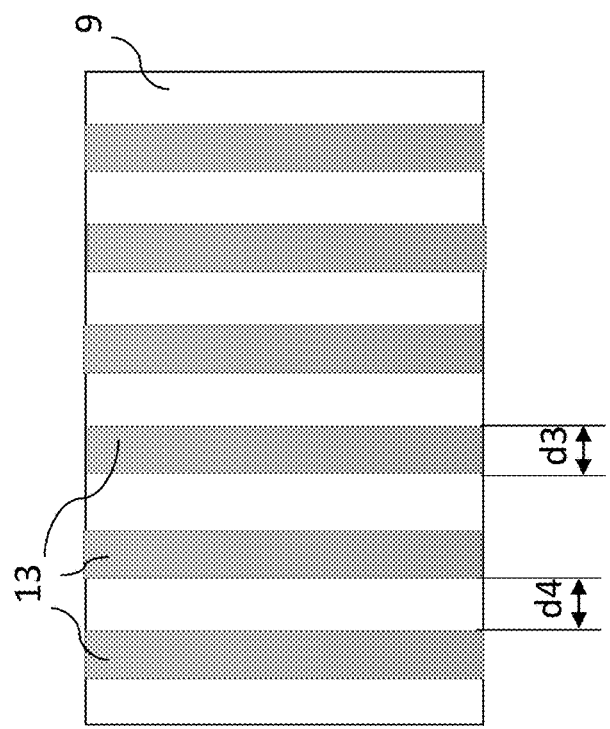
FIGS. 8(a)-8(b) illustrate an alternative embodiment of the block of FIGS. 6(a)-6(b)
Figure 8A:
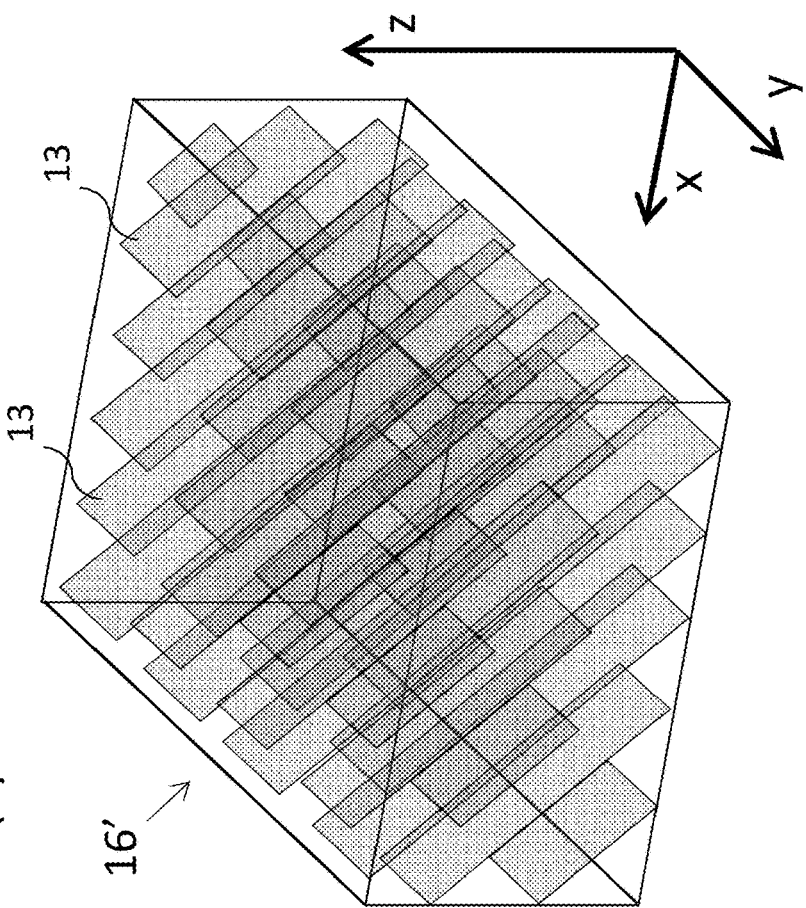

FIGS. 8(a)-8(b) illustrate an alternative embodiment of block 16, denoted here as block 16'. In this embodiment, the transparent plates are each only partly coated with a partially reflective coating which is applied to each plate in strips with gaps therebetween. Each coating strip has the same predetermined thickness d3 while the gaps between the coating strips each have the same predetermined thickness d4, as described in U.S. Patent Publication No. 2018/0292599 to Lumus Ltd. In this embodiment, d3 corresponds to the desired width of the reflecting region of LOE 1 in the final compound LOE, and d4 is calculated according to the equation:

$$d4=d1+d2-d3$$

where d1 and d2 have been defined previously above.

Figure 9B:
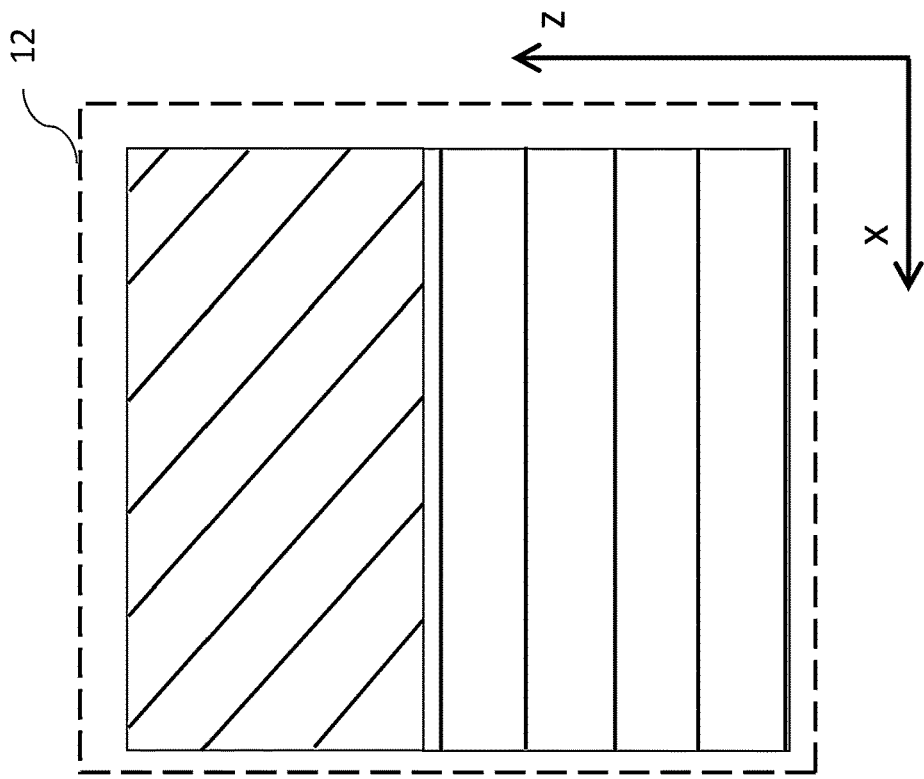
FIGS. 9(a)-9(b) illustrate an optical structure formed from bonding of the block of FIGS. 8(a)-8(b) with the stack of FIGS. 5(a)-5(b)
Figure 9A:
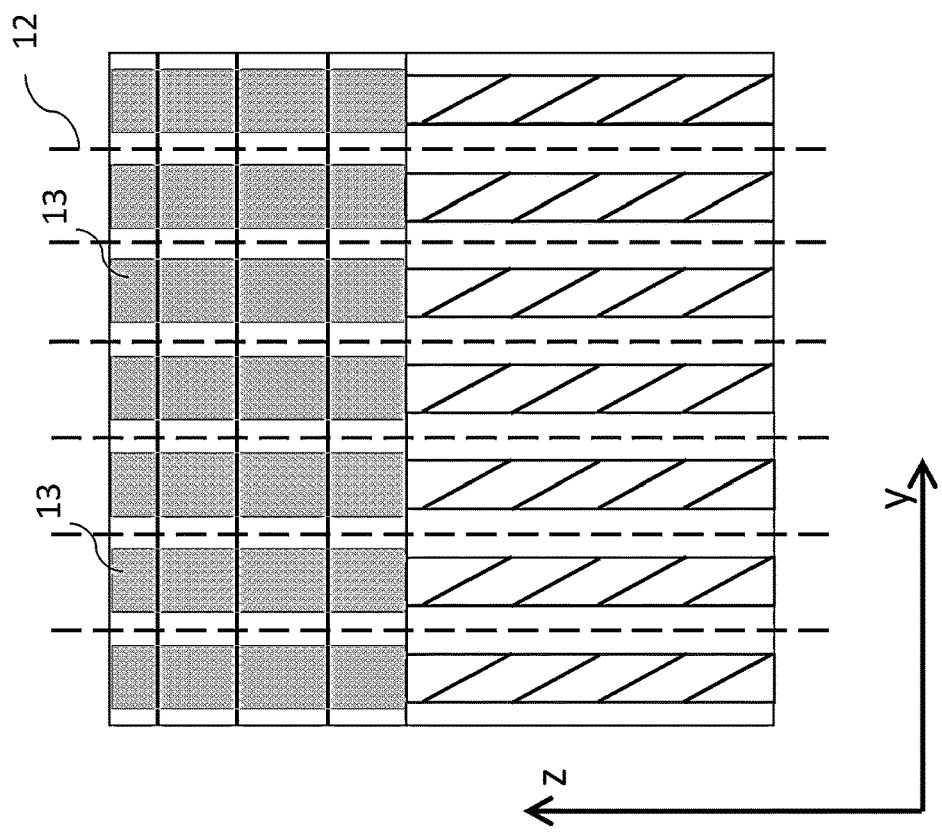

FIGS. 9(a)-9(b) illustrate block 16' aligned and bonded to stack 15, and cut along planes 12, in a similar manner as described above with reference to FIGS. 7(a)-7(b). The extracted slices are shown in FIGS. 10(a)-10(b). These slices may likewise be polished on the external parallel surfaces to form the final compound LOEs. It should be noted that the compound LOE formed according to this embodiment, includes a buffer between the partially reflective facets 4 of LOE 1 and external surfaces 14, the buffer being provided by the gaps between coating strip and achieving a similar effect as transparent cover plates without requiring physical cover plates.

It should be appreciated that the bonded block 16' and stack 15 represents another embodiment of the intermediate optical structure block 18. In fact, various other embodiments of block 16 (and therefore block 18) are also possible for yielding a variety compound LOEs having a different structures in regards to LOE 1, some of which are described below.

For example, in some embodiments, it may be desirable for some of facets 4 of LOE 1 to not extend all the way across LOE 1, thereby providing one or more un-faceted regions (i.e. without partially reflective internal surfaces) within LOE 1, as will be illustrated in the following examples.

Figure 11B:
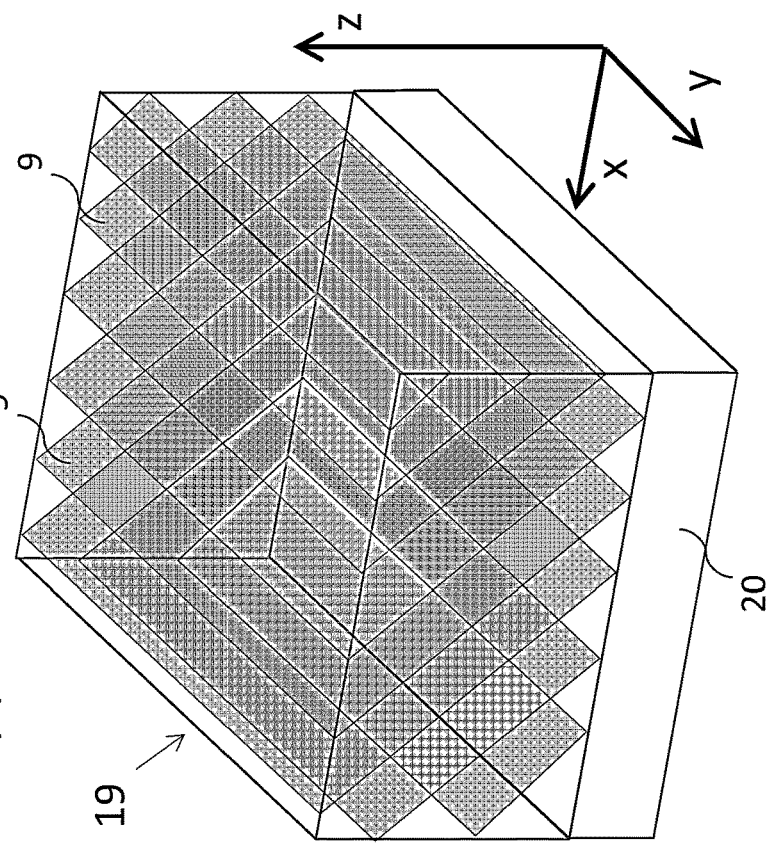
FIGS. 11(a)-11(b) illustrate another embodiment of block 16.
Figure 11A:
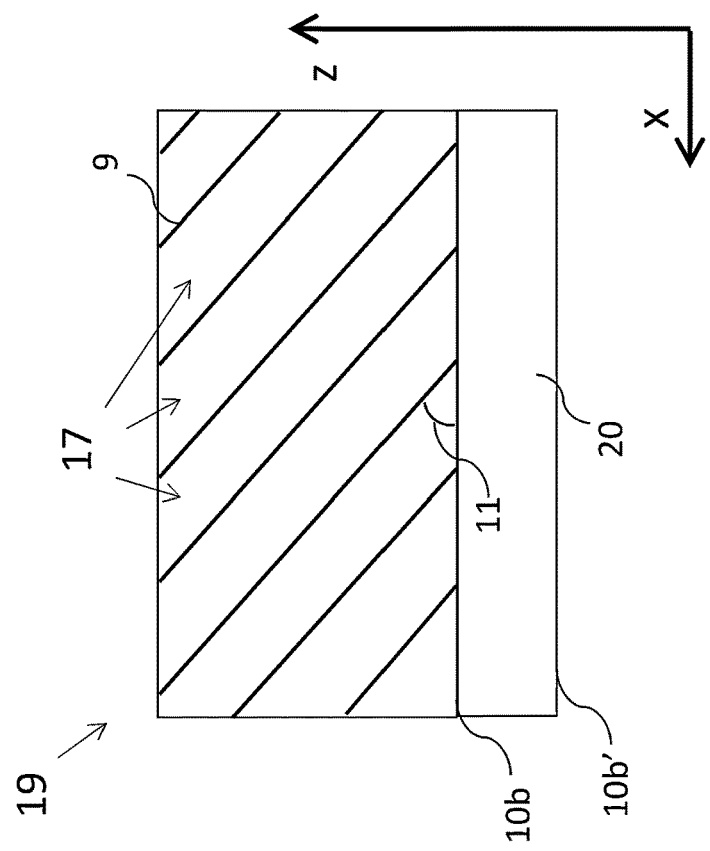

FIGS. 11(a)-11(b) illustrate another embodiment of block 16, denoted here as block 19. Block 19 consists of block 16 (as in FIGS. 6(a)-6(b)) with an additional plane-parallel transparent plate 20 bonded to face 10b of the block 16. The outer surface 10b' of plate 20 is polished parallel to face 10b.

Figure 12A:
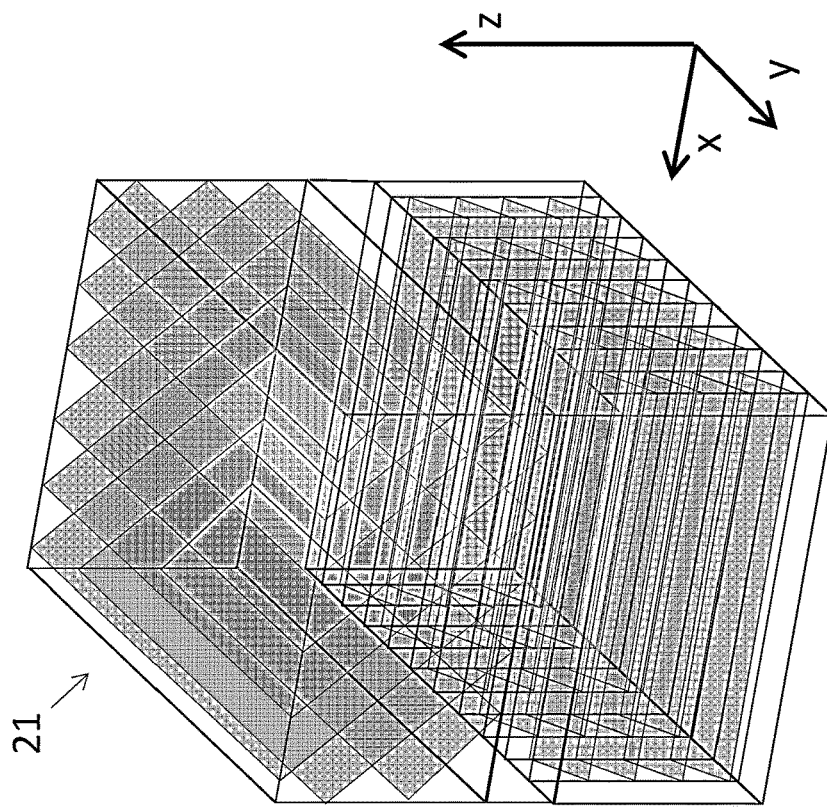
FIGS. 12(a)-(b) illustrate an optical structure formed from bonding of the block of FIGS. 11(a)-11(b) with the stack of FIGS. 5(a)-5(b)
Figure 12B:
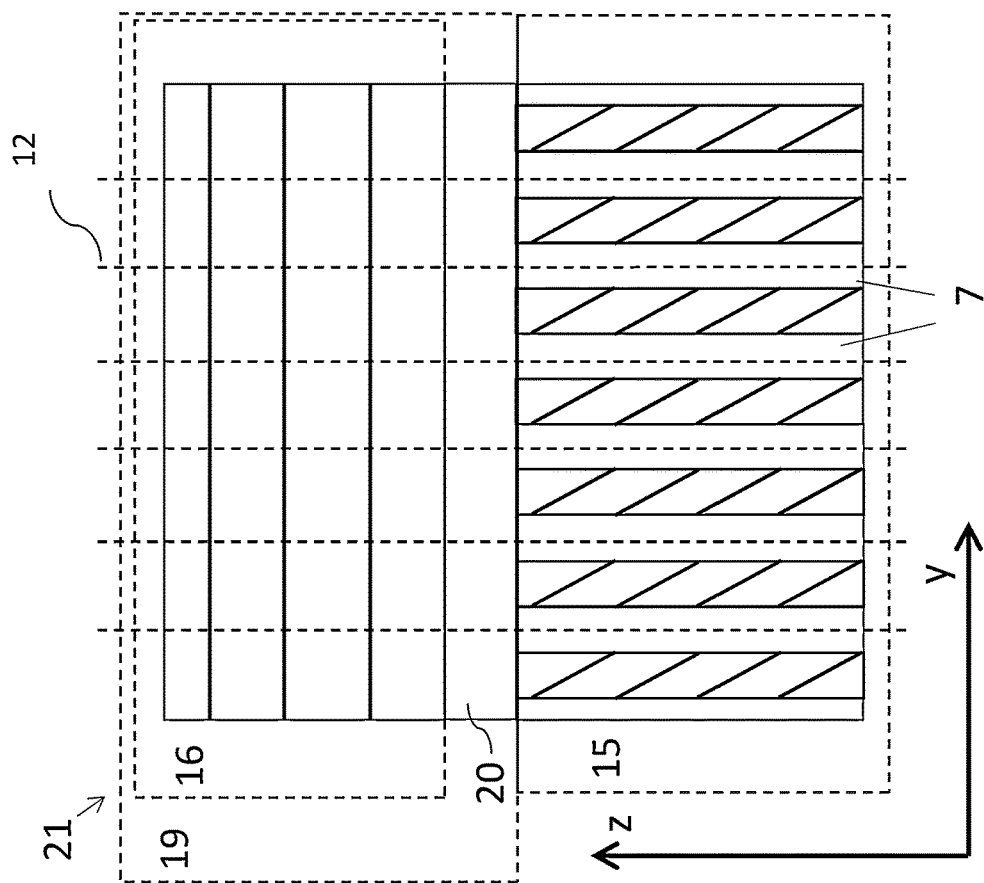
Figure 12C:
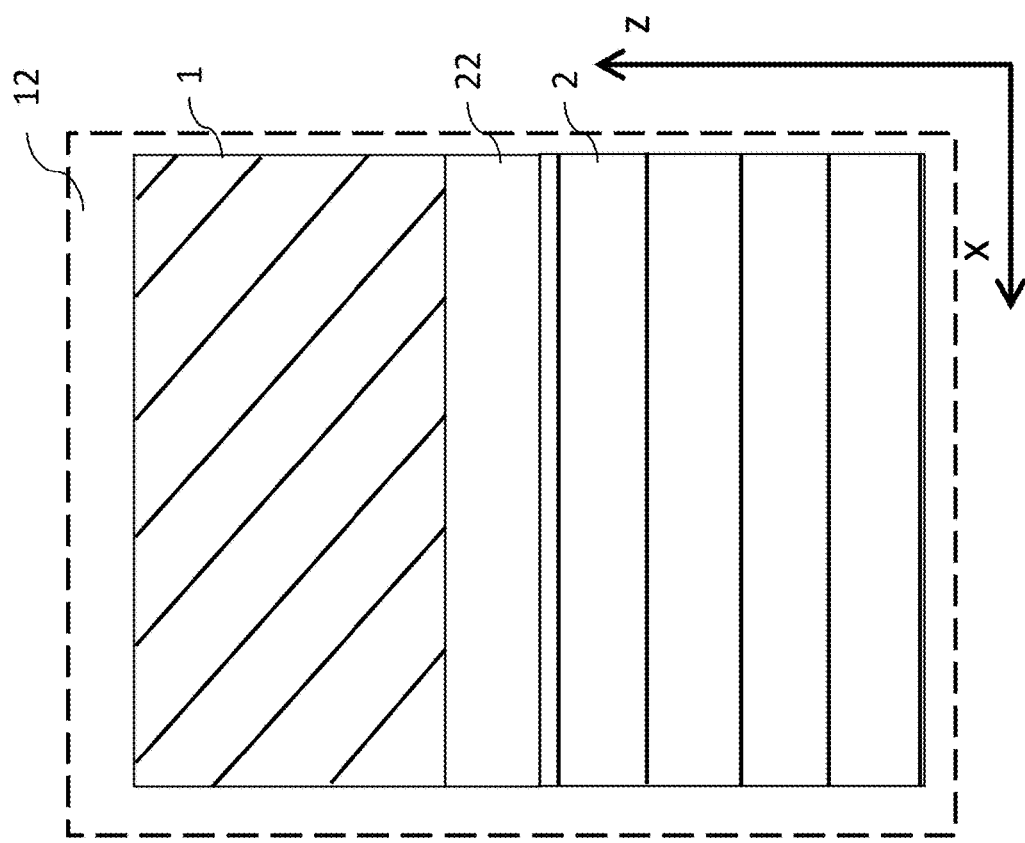
FIGS. 12(c)-(d) illustrate a slice taken from the optical structure of FIGS. 12(a)-(b)
Figure 12D:
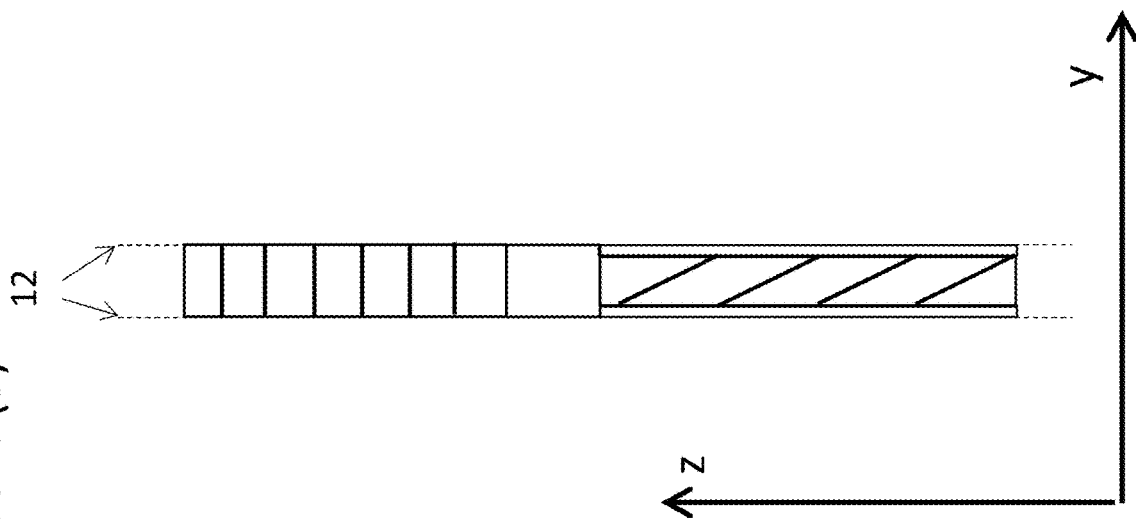

Block 19 and stack 15 are aligned and bonded together as shown in FIGS. 12(a)-(b), forming intermediate optical block 21. Block 21 subsequently is sliced along the planes 12 parallel to XZ plane. One such resulting slice is shown in FIGS. 12(c)-(d). Such a slice consists of LOE 1, LOE 2, and an optically clean area 22 (also called inert area) free of any reflective or semi-reflective surfaces. Alternatively, area 22 can also include one or more optical elements such as a partially reflective mixer or polarizer. In this case, transparent plate 20 can be substituted for a plate that incorporates the desired one or more optical elements (i.e. mixer, polarizer, etc.).

Figure 13B:
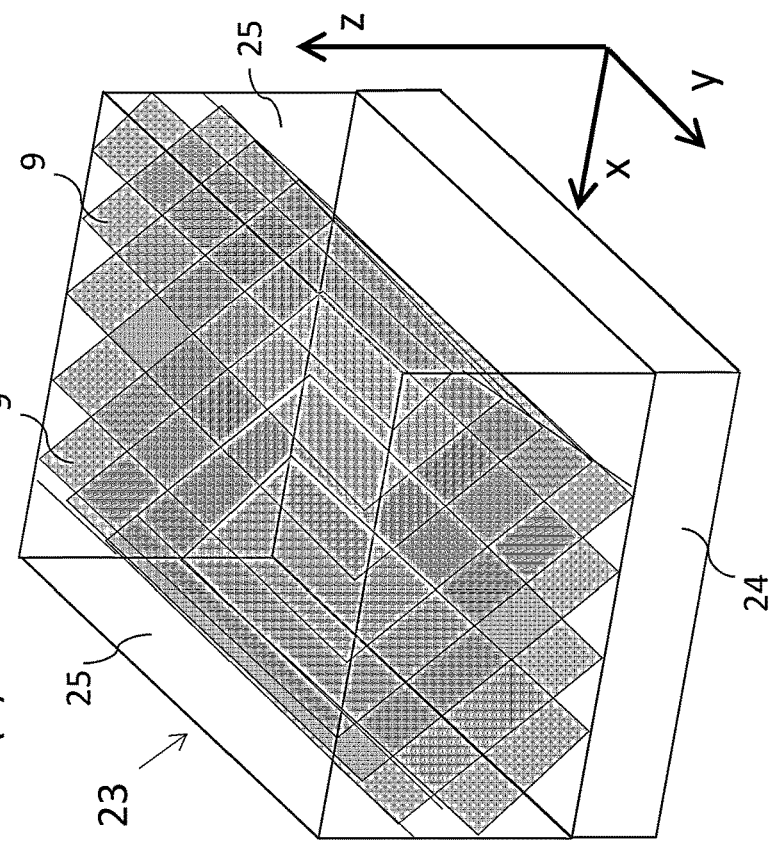
FIGS. 13(a)-13(b) illustrate another embodiment of block 16.
Figure 13A:
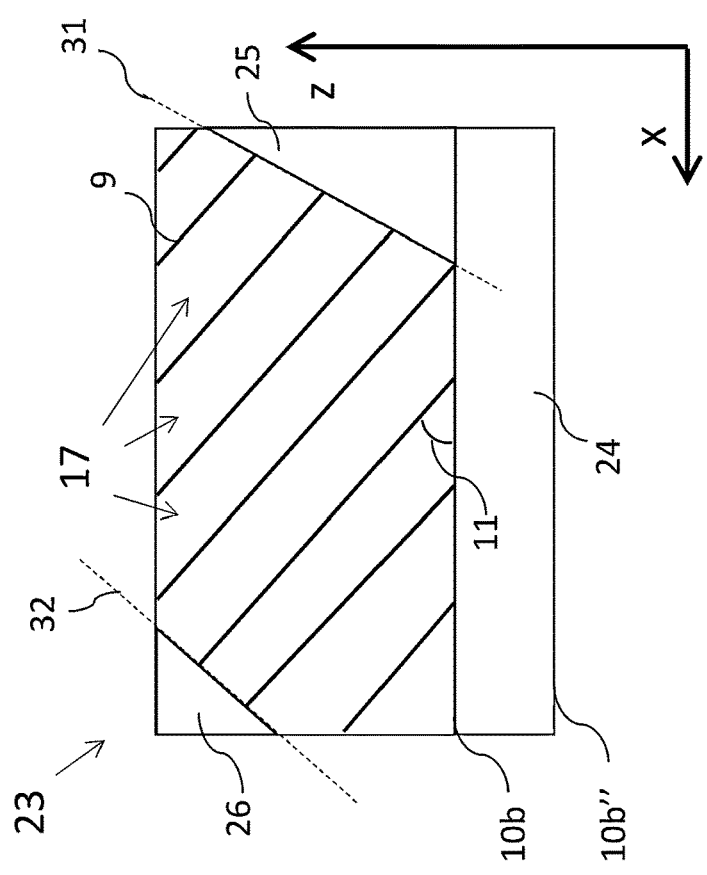
Figure 13D:
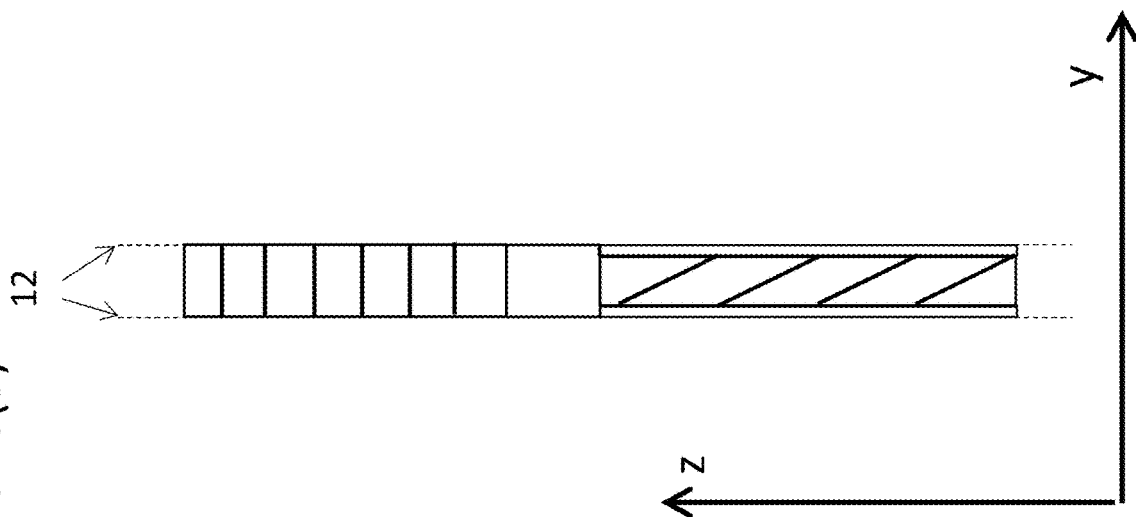
FIGS. 13(c)-(d) illustrate a slice taken from the optical structure of FIGS. 13(a)-(b).
Figure 13C:
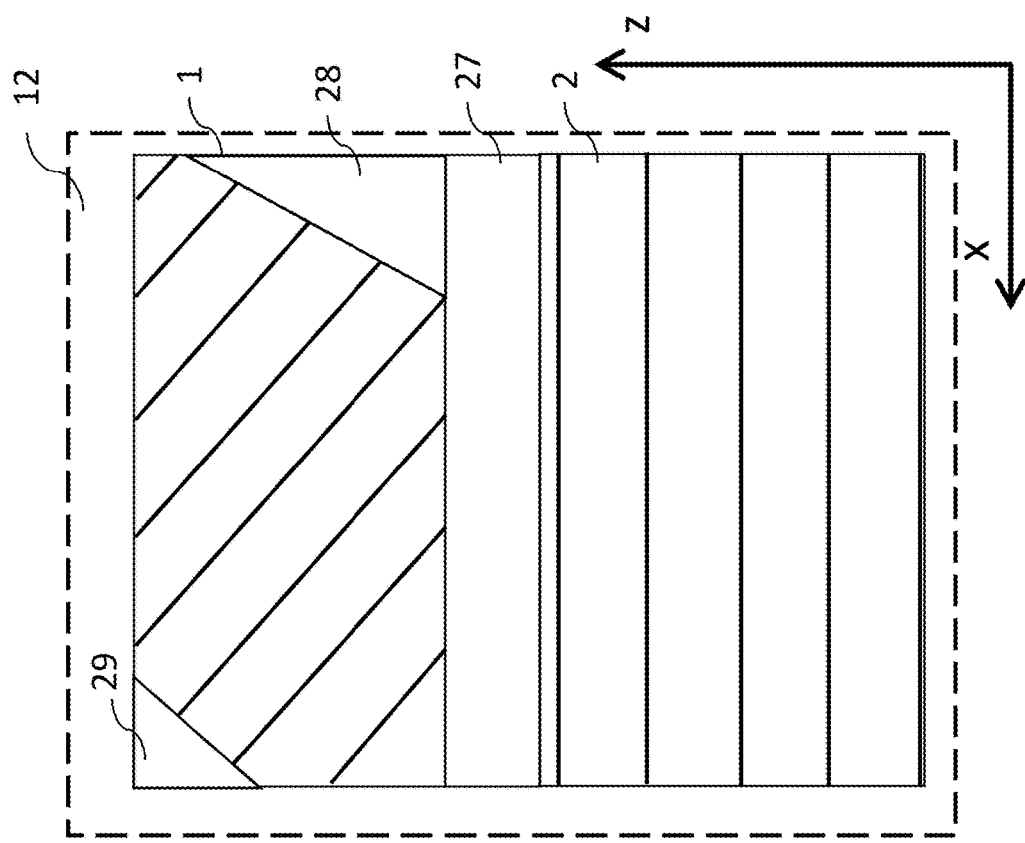

FIGS. 13(a)-13(b) illustrate another embodiment of block 16 in which more complex geometries of LOE 1 can be produced by cutting and bonding block 16 with other optical plates and/or prisms. In FIGS. 13(a)-(b), block 16 is cut and polished along the planes 31 and 32 and bonded with transparent plate 24 and triangular prisms 25 and 26. The polished surface 10b" of the plate 24 is parallel to face 10b of the block 16. Block 16 with plate 24 and prisms 25 and 26 form a new optical block 23 which includes one or more un-faceted sub-regions within the block. In a similar way as shown in FIG. 12 (a)-(b), block 23 is aligned and bonded with stack 15 to form a new intermediate structure. The intermediate structure is subsequently sliced along the planes 12, resulting in a slice shown in FIGS. 13(c)-(d). Such a slice has inert areas 27, 28 and 29, free from any reflecting or semi-reflecting surfaces.

In other embodiments (not shown) the LOE precursors of stack 15 can be modified to include one or more facet-free regions within the LOE precursor, thereby yielding compound LOEs in which LOE 2 includes one or more unfaceted sub-regions (i.e. free of partially reflective internal surfaces).

It will be appreciated that the above descriptions are intended only to serve as examples, and that many other embodiments are possible within the scope of the present invention as defined in the appended claims.

What is claimed is:

1. A method of fabricating a compound light-guide optical element (LOE), comprising:
    providing a bonded stack of a plurality of LOE precursors and a plurality of transparent spacer plates, the stack having a first pair of parallel faces, the stack comprising alternating LOE precursor and transparent spacer plates along a length of the stack perpendicular to the pair of parallel faces, each LOE precursor comprising a pair of major parallel surfaces and a first plurality of mutually parallel partially reflective internal surfaces angled obliquely relative to the pair of parallel surfaces;
    providing a first optical block having a second pair of parallel faces, and a plurality of mutually parallel internal surfaces angled obliquely relative to the second pair of parallel faces, the internal surfaces being at least partly partially reflective such that the first block comprises a second plurality of mutually parallel partially reflective internal surfaces;
    bonding the first block to the stack such that one of the faces of the first block is joined to one of the faces of the stack and the first plurality of partially reflective internal surfaces is non-parallel to the second plurality of partially reflective internal surfaces, thereby forming a second optical block; and
    slicing out at least one compound LOE from the second block by cutting the second block through at least two consecutive spacer plates having a LOE precursor sandwiched therebetween.

2. The method of claim 1, comprising polishing the face of the stack that will be joined to the first block prior to bonding the stack with the first block.

3. The method of claim 1, comprising polishing the face of the first block that will be joined to the stack prior to bonding the first block with the stack.

4. The method of claim 1, comprising, prior to bonding the first block to the stack: aligning the first block and the stack such that first plurality of partially reflective internal surfaces and the second plurality of partially reflective internal surfaces are orthogonal.

5. The method of claim 1, further comprising polishing the external surfaces of the sliced-out at least one compound LOE that are parallel to the major parallel surfaces of the LOE precursor.

6. The method of claim 1, wherein the internal surfaces of the first block are each only partly coated with a partially reflective coating, such that internal surface comprises strips of partially reflective coating with gaps therebetween.

7. An optical structure that is an intermediate work product of a compound LOE fabrication process, the optical structure comprising:
    a first region comprising a plurality of LOE precursors separated by transparent spacer plates therebetween, each LOE precursor comprising a pair of major external parallel surfaces and a first plurality of mutually parallel partially reflective internal surfaces being angled obliquely relative to the pair of parallel surfaces;
    a second region comprising a second plurality of mutually parallel partially reflective internal surfaces being non-parallel to the first plurality of partially reflective surfaces; and
    at least one internal surface separating the first and second region, the internal surface being perpendicular to the pairs of parallel surfaces.

8. The optical structure of claim 7 formed by bonding a first optical block comprising the first region with a second optical block comprising the second region.

9. The optical structure of claim 7, further comprising a third optical region between the first region and the second region.

10. The optical structure of claim 9, wherein the third optical region comprises one or more optical elements.

11. The optical structure of claim 9, wherein the third optical region is optically inert.

12. The optical structure of claim 7, wherein at least one sub-region within the second region is free of any partially reflective internal surfaces.

13. The optical structure of claim 7, wherein each LOE precursor in the first region comprises at least one sub-region that is free of any partially reflective internal surfaces.

* * * * *